E. A. SPERRY.
STABILIZING GYROSCOPE.
APPLICATION FILED AUG. 11, 1917.

1,312,085.

Patented Aug. 5, 1919.
3 SHEETS—SHEET 1.

INVENTOR
Elmer A. Sperry.
BY
Herbert H. Thompson
ATTORNEY

E. A. SPERRY.
STABILIZING GYROSCOPE.
APPLICATION FILED AUG. 11, 1917.
1,312,085.
Patented Aug. 5, 1919.
3 SHEETS—SHEET 2.
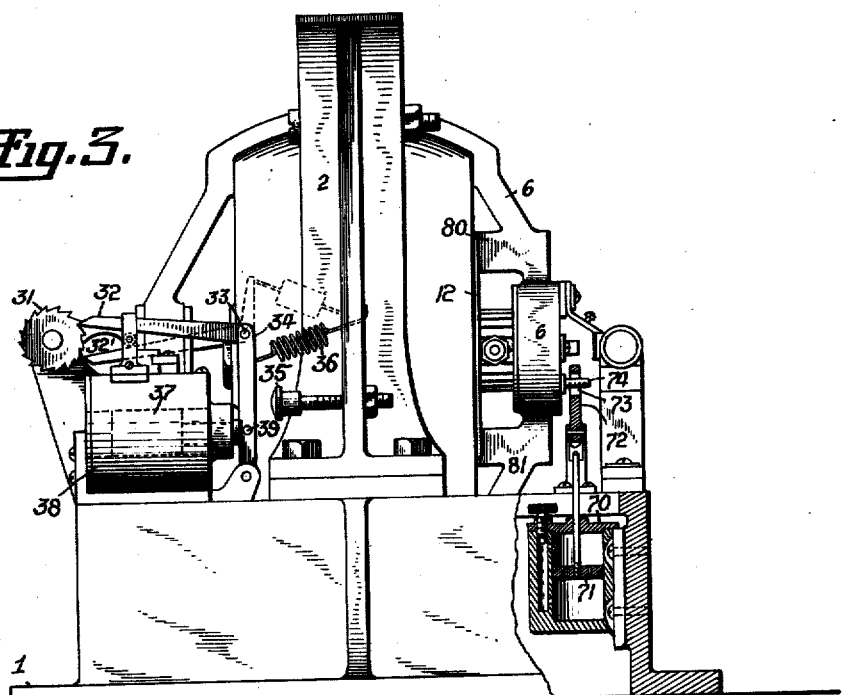
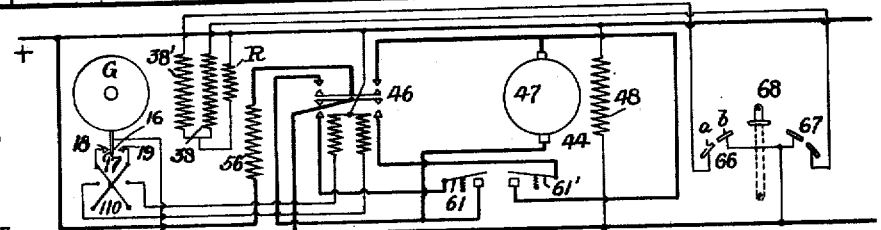
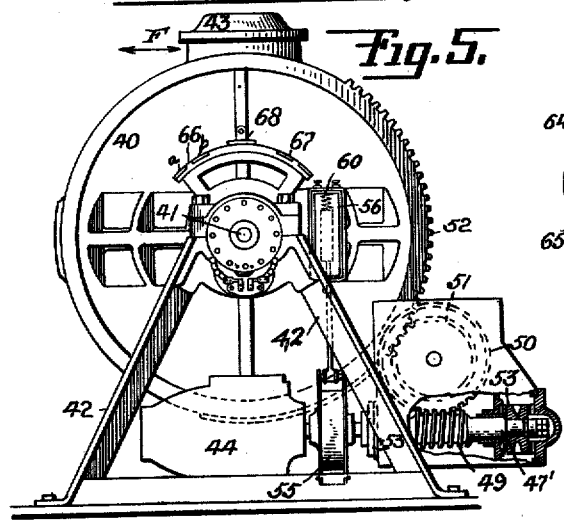
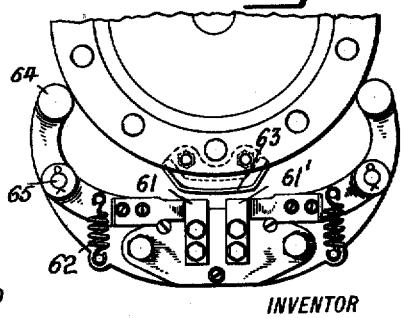
INVENTOR
Elmer A. Sperry.
BY
Herbert H. Thompson
ATTORNEY E. A. SPERRY.
STABILIZING GYROSCOPE.
APPLICATION FILED AUG. 11, 1917.
1,312,085.
Patented Aug. 5, 1919.
3 SHEETS—SHEET 3.
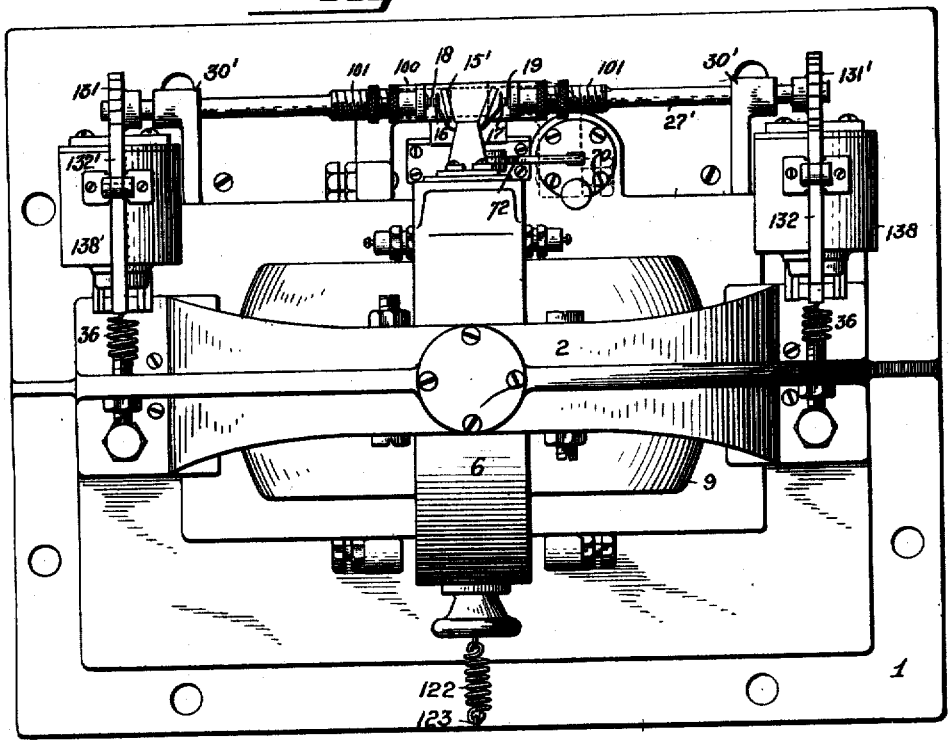
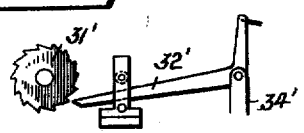
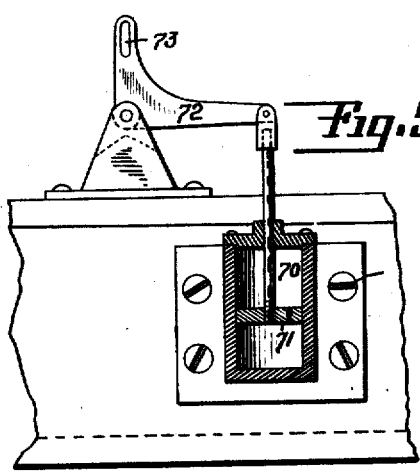
INVENTOR
Elmer A. Sperry.
BY
Herbert H. Thompson
ATTORNEY

UNITED STATES PATENT OFFICE.

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

STABILIZING-GYROSCOPE.

1,312,085. Specification of Letters Patent. Patented Aug. 5, 1919.

Application filed August 11, 1917. Serial No. 185,718.

*To all whom it may concern:*

Be it known that I, ELMER A. SPERRY, a citizen of the United States of America, residing at 1505 Albermarle road, Brooklyn, in the county of Kings and State of New York, have invented certain new and useful Improvements in Stabilizing-Gyroscopes, of which the following is a specification.

This invention relates to gyroscopes for controlling the roll of ships. More particularly the invention is an improvement on the general type of gyroscopic apparatus shown in applicant's U. S. Patent No. 1,232,619, wherein a large or main gyroscope is used for exerting the stabilizing stresses on the ship; while a much smaller and more sensitive gyroscope or its equivalent is used for controlling the precession of the main gyroscope.

In systems of this character, much trouble has arisen in keeping the main or stabilizing gyroscope in exact synchronism with the rolling of the ship. It has been found, especially when the sea is comparatively smooth, that the main gyroscope will very often precess for unequal distances from each side of the normal or centralized position, so that when a larger wave than usual strikes the ship the gyroscope precesses against the fixed stop before the ship has completed the roll, thereby allowing an appreciable rolling motion to be imparted by the wave.

The main object of this invention is to synchronize more effectively the precession of the main gyroscope with the rolling of the ship and to cause its precession on the two sides of the centralized position in approximately equal amounts. Preferably this object is accomplished by altering the centralized position of the auxiliary or control gyroscope with respect to the control contacts thereon.

Referring to the drawings, in which are now considered the preferred forms of the invention, are shown:

Fig. 3 is an end elevation of the same.

Fig. 4 is a wiring diagram showing one method of controlling the main gyroscope from the auxiliary gyroscope, and the main electrical connections for adjusting the auxiliary gyroscope.

Fig. 5 is a side elevation on a very much reduced scale compared to the scale of Figs. 1, 2, and 3, of the main or stabilizing gyroscope. As actually built, of course, this gyroscope is many times as large as the auxiliary gyroscope.

Fig. 6 is a detail showing the limit switches on the main gyroscope.

Fig. 7 is a plan view of a modified form of control gyro.

Fig. 8 is a detail of one of the pawls on the auxiliary gyroscope.

Fig. 9 is a detail of the damping means used on the auxiliary gyroscope.

Figure 1:
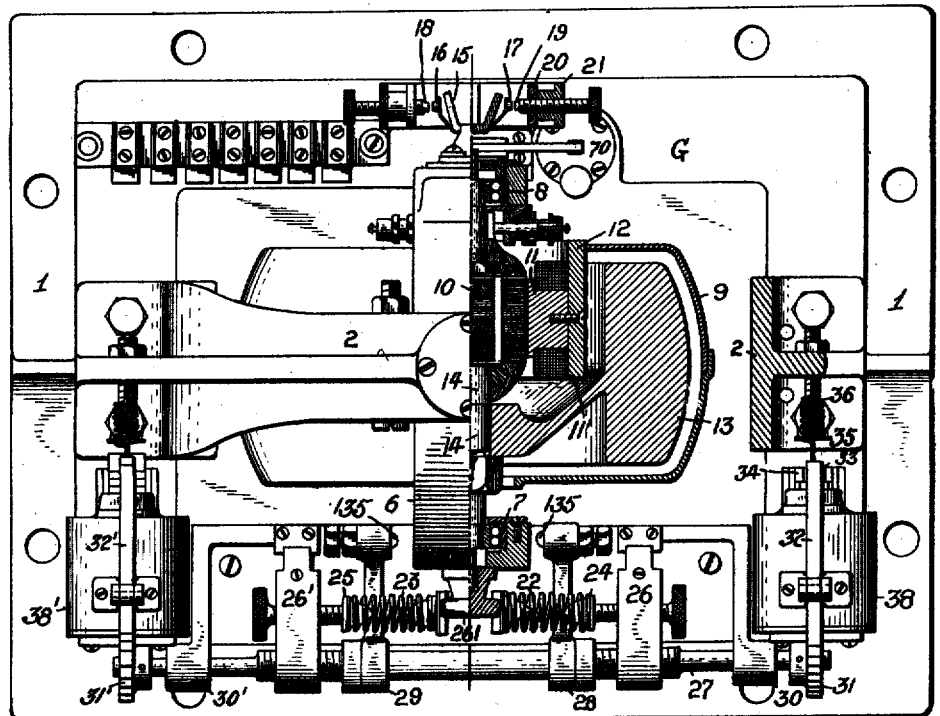
Figure 1 is a plan view partly in section of the auxiliary or control gyroscope.
Figure 2:
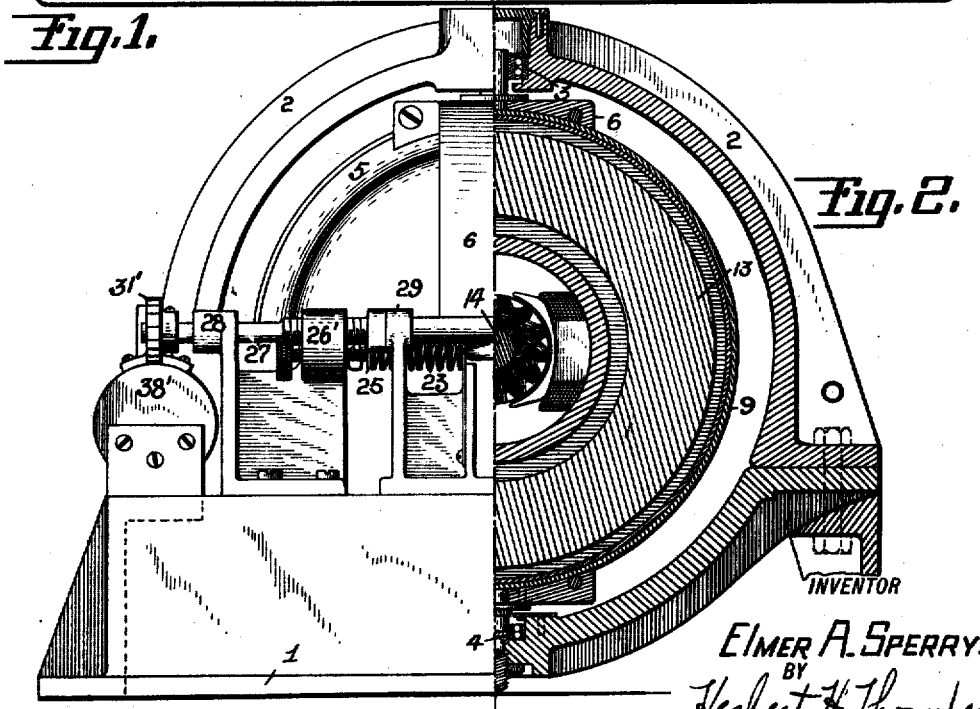
Fig. 2 is a side elevation partly in section of the same.

The auxiliary gyroscope G shown for illustration is mounted on a base plate 1, to which is bolted the vertical ring 2. Within said ring are vertical bearings 3 and 4 which support the gyro rotor casing or frame 5 for precession about the vertical axis. The said frame is shown as comprising a ring 6 within which are placed the normally horizontal bearings 7 and 8 for the rotor 13. A light casing 9 is shown secured to said ring. The rotor is preferably electrically driven, having mounted on the shaft 14 thereof an armature 10 of an electrical motor, the field poles 11 and windings 11' being supported from a frame 12. Said frame is shown as secured to ring 6 by extensions 80 and 81 (see Fig. 3). The rotor 13 is shown as secured to the lower end of rotor shaft 14 and over-laps in part said frame 12. Secured to ring 6 or other part of the gyro casing is a contact member 15 to which are secured one or more contacts 16 and 17. The said contacts are preferably resilient and stand out a short distance beyond member 15 so that they will be brought into contact with the relatively fixed contacts 18 and 19 before offering any appreciable resistance to the precession of the gyroscope. The said contacts 18 and 19 are preferably adjustable by being made in the form of set screws threaded in the fixed support 20 and held in any given position by thumb nut 21.

Resilient or yielding means of any suitable character are secured to the gyroscope to cause it to centralize or normally settle in a predetermined position. As shown, said resilient means comprise a plurality of springs 22 and 23 supported between relatively fixed abutments 24 and 25 and a projection 261 secured to ring 6. The said springs are normally so positioned as to maintain the contacts 16 and 17 on the gyroscope midway between the fixed contacts 18 and 19. The abutments 24 and 25 may be adjustably threaded in members 26 and 26' which in turn are movably or adjustably mounted with respect to base plate 1.

It will be readily apparent that by moving members 26 and 26' in one direction or the other, that the relative position of the contacts 18 and 19 and of the normally centralized position of the gyroscope will be altered. For this purpose members 26 and 26' are shown as threaded upon a rod 27 which is journaled in brackets 28, 29, 30 and 30' on the base plate. Said rod is provided adjacent its ends with oppositely acting ratchet wheels 31, 31'. A pawl 32 to coöperate with said ratchet 31 is shown as pivoted at 33 to a lever 34 which is normally held in a retracted position in engagement with adjustable stop 35 by the spring 36. Movable core 37 of the solenoid 38 or like electro-magnetic means, is pivotally connected at 39 to lever 34. When said solenoid is energized the core is drawn inwardly thereby rotating ratchet 31 through one or more teeth. Pawl 32' may be similarly actuated from one solenoid 38' (see Figs. 1, 3 and 8).

Preferably fixed stops 135 are provided in addition to the member 15 to limit the movement of the auxiliary gyroscope and relieve said member of the greater part of the strain.

The control gyro is also preferably provided with a means for preventing undue oscillation or chattering of the control contacts. This may consist of a dash pot 70 or the like having the piston 71 thereof connected to a bell crank lever 72 (see Fig. 9). The upstanding arm of said lever has a slot 73 which engages over a pin 74 on the ring 6.

The main gyroscope in Fig. 5 is shown as inclosed within a casing 40 pivoted upon horizontal trunnions 41 journaled in brackets 42. The trunnions preferably extend athwartships as indicated by the arrow F in Fig. 5 showing the fore and aft line of the ship. The rotor in the form illustrated is journaled upon a vertical axis within bearings 43. For controlling the precession of said gyroscope an electrically driven translating device or motor 44 is provided which is controlled from the auxiliary gyroscope directly or indirectly through a relay 46 (see Fig. 4) from the contacts 16, 17, 18 and 19 on the auxiliary gyroscope. As shown in the wiring diagram, the armature 47 of the motor is reversed with respect to the shunt field 48. The said motor is shown as geared to the gyroscope through a worm 49 mounted on an extension 47' of the motor shaft. A worm wheel 50 meshes with said worm and a gear 51 behind the worm wheel and secured thereto meshes with large gear 52 on or secured to the casing 40. Thrust bearings 53 are shown as provided for worm shaft 47' to take up the thrust of the gyroscope when the motor is cut off or when the gyroscope tends to precess faster than the motor is running. When either of these conditions arise a brake 55 may also be applied. As shown in Fig. 4 this operation is effected by a solenoid 56 preferably placed in series with the armature 47 of the motor 44. The coil or solenoid normally acts to hold the brake in the retracted position, but when the motor current or circuit is shut off or when its value falls below a predetermined amount due to the motor exceeding a predetermined speed, a spring 60 opposed to the solenoid applies the brake band. Limit switches 61 and 61' are preferably provided to throw out motor 44 when the gyroscope has precessed to about 60° on either side of the normal position. The said switches are normally held closed by spring 62, but each switch is opened when the lug 63 strikes arm 64 pivoted at 65 upon which the switch is supported. For controlling the solenoids 38 and 38' contacts 66, 67 are mounted adjacent the gyroscope and coöperating contacts 68 secured to the gyroscope. Contacts 66 and 67 are shown as comprising two parts $a$ and $b$, so that contact 68 is adapted to complete a circuit between the parts $a$, $b$ thereby avoiding the necessity of carrying an electrical circuit into the oscillating gyroscope. Contacts 66 and 67 are preferably positioned an equal distance on each side of the central or vertical position of the gyroscope and at a less angle to the vertical than the limit switch so that if the gyroscope swings to the extreme position in either direction, two impulses will be sent from each contact, as the gyroscope passes it going to and returning from the extreme position. This will, of course, move corresponding ratchet 31 through two notches. A different means for shifting the effective relation between the centralizing springs and the control contacts of the auxiliary gyroscope is shown in Fig. 7. Instead of altering the tension of the springs, the relatively stationary contacts are adjusted. The gyroscope 9 is shown as centralized by a tension spring 122 extending between a pin 123 on base 1 and ring 6 on the gyroscope.

The bracket 100 which supports the relatively stationary contacts 18 and 19 is movably mounted on the base plate and is threaded upon threaded portion 101 of the rod 27'. The said rod is shown as journaled in brackets 30' on the base plate and is provided with oppositely acting ratchet wheels 131 and 131' as in the other form. The said ratchets are operated from solenoids 138, 138' by means of oppositely acting pawls 132 and 132' as before.

It will readily be seen that the same net result is accomplished in this form of the invention as in the principal form; since in each instance when the contact on the main gyroscope is completed, the control gyroscope must do more work to complete the contact either by moving through a greater distance or by acting against an increased tension of the spring.

The operation of this invention is as follows:

If the sea is fairly calm and the main gyroscope is oscillating only slightly in each direction on equal sides of the vertical position, no adjustment of the centralizing springs will take place on the gyroscope. If, however, the main gyroscope gradually works over into one or the other quadrants of oscillation, the contact 68 will complete a circuit between contacts *a* and *b* of one or the other of the pairs of contacts 66 or 67 thereby causing movement of the supports of the centralizing springs in the direction to cause the auxiliary gyroscope to normally centralize at a further distance from the contact which causes precession of the main gyroscope in the direction then occurring, so that on the next roll the other contact will be completed sooner and the first mentioned contact later, thereby tending to cause the main gyroscope to work back to its original position. If it has not done so by the next roll in that direction, the solenoid will again cause further adjustment of the spring. This cycle will be repeated until the main gyroscope is brought back to its normal position. If then it should start to work back in the other direction, a reverse action will take place.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

The application of this invention to rolling a ship by the gyroscopic system will be evident to those skilled in the art. A reversing switch 110 is shown in Fig. 4 between the auxiliary gyroscope G and relay 46 to indicate this possible use of the apparatus.

Having described my invention, what I claim and desire to secure by Letters Patent is:

1. The combination with a main and an auxiliary gyroscope, of connecting means between said two gyroscopes whereby the latter controls the precession of the former, and means responsive to the position of the former for altering the relation of said means to the auxiliary gyroscope.

2. The combination with a gyroscope adapted to remain normally in a predetermined position, resilient means for opposing movement in either direction away from said normal position, and a means for shifting the position of said resilient means to alter the said normal position of the gyroscope.

3. The combination with a gyroscope supported for precession about an axis, spring means connected thereto for centralizing the gyroscope in a predetermined position, contacts thereon and on a relatively stationary part and means for altering the relative position of said centralized position and the contacts on the stationary part.

4. The combination with a body subject to oscillation, of a stabilizing gyroscope therefor, means for controlling the precession of said gyroscope, a device responsive to rolling of the body for governing said means, and means responsive to the amplitude of precession for altering the governing action of said device.

5. The combination with a main and an auxiliary gyroscope, of connecting means between said two gyroscopes whereby the latter controls the precession of the former, means responsive to the amplitude of precessional oscillation of the former in one direction, for changing the controlling action of the latter in that direction.

6. The combination with a gyroscope mounted for precession about an axis, of governing contacts mounted about said axis and damping means also operable about said axis of the gyroscope.

7. The combination with a main and an auxiliary gyroscope, contacts operable by said auxiliary gyroscope for controlling the main gyroscope and damping means on said auxiliary gyroscope for rendering stable the operation of said contacts.

8. The combination with a body subject to oscillation, of a stabilizing gyroscope therefor, means for controlling the precession of said gyroscope, a device responsive to rolling of the body for governing said means, and means responsive to the amplitude of precession of said gyroscope in either direction for retarding the governing action of said device in the indicated direction.

9. The combination with a gyroscope, of means for offering resistance to the precession thereof in either direction and means for varying the resistance offered by said first means whereby a greater resistance is offered to precession in one direction than in the other direction.

10. The combination with a body subject to oscillation, of a stabilizing gyroscope therefor, means for controlling the precession of said gyroscope, a device responsive to rolling of the body for governing said means, a limit contact on said gyroscope for rendering said means inoperative, and another contact on said gyroscope at a less angular distance from the normal position thereof for altering the governing action of said device.

11. The combination with a gyroscope mounted for precession about an axis, of governing contacts mounted about said axis, a centralizing spring acting on said gyroscope about said axis, a movable support for the free end of said spring and means for adjusting the position of said support.

12. The combination with a gyroscope mounted for precession about an axis, of a movable support adjacent said gyroscope, governing contacts mounted thereon and on said support, and means for adjusting the position of said support.

13. The combination with a gyroscope mounted for precession about an axis, of governing contacts mounted about said axis, a centralizing spring acting on said gyroscope about said axis, a movable support for the free ends of said spring, a rod on which said support is threaded, an electro-magnetic means operable from a distance for turning the rod in either direction to adjust the position of the support.

14. The combination with a main and an auxiliary gyroscope, of connecting electro-mechanical means between said two gyroscopes whereby the latter controls the precession of the former, and contact means responsive to the position of the former for altering the relation of said means to the auxiliary gyroscope.

In testimony whereof I have affixed my signature.

ELMER A. SPERRY.

Copies of this patent may be obtained for five cents each, by addressing the "Commissioner of Patents, Washington, D. C."